US008841582B2

(12) United States Patent
Bender et al.

(10) Patent No.: US 8,841,582 B2
(45) Date of Patent: Sep. 23, 2014

(54) ENGINE DRIVEN WELDING MACHINE (75) Inventors: David Joseph Bender, Chardon, OH (US); Darren Stockton, Chardon, OH (US); Rich Lesiacsek, Willoughby Hills, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1477 days.

(21) Appl. No.: 12/245,283

(22) Filed: Oct. 3, 2008

(65) Prior Publication Data

US 2010/0084387 A1 Apr. 8, 2010

(51) Int. Cl.
*F02B 63/04* (2006.01)
*F16M 3/00* (2006.01)
*B23K 9/10* (2006.01)

(52) U.S. Cl.
CPC ............ *B23K 9/1006* (2013.01); *F02B 63/04* (2013.01); *F16M 3/00* (2013.01); *F02B 2063/045* (2013.01)
USPC .............................. 219/133; 290/1 A; 290/1 E (58) Field of Classification Search
CPC ........... F02B 2063/00; F02B 2063/045; F02B 2063/047
USPC .............. D13/110, 114, 116; 123/2; 114/112; 219/59, 57, 125.1, 133, 136; 290/1 A, 290/1 B; 901/42
See application file for complete search history.

(56) References Cited

U.S. PATENT DOCUMENTS

| | | |
|---|---|---|
| D59,357 S | 10/1921 | Kalenborn |
| D105,931 S | 9/1937 | Adams |
| D108,710 S | 3/1938 | Akins |
| D118,040 S | 12/1939 | Gilkison |
| D152,049 S | 12/1948 | Welch, Jr. |
| 3,695,702 A | 10/1972 | Ingellis |
| D278,425 S | 4/1985 | Toshihiko |
| D293,904 S | 1/1988 | Murakami et al. |
| D355,780 S | 2/1995 | Noll |
| 5,685,440 A | 11/1997 | Mason |
| 5,965,949 A | 10/1999 | Fukuda et al. |
| D418,809 S | 1/2000 | Frank |
| D433,040 S | 10/2000 | Krieck |

(Continued)

FOREIGN PATENT DOCUMENTS

| | | | |
|---|---|---|---|
| JP | 2001-129911 | | 5/2003 |
| JP | 2003-129911 | * | 5/2003 |

OTHER PUBLICATIONS

POWER-ARC 5500, Operator's Manual, Copyright 2007, Lincoln Global Inc., 50 pgs.

(Continued)

*Primary Examiner* — Brian Jennison
(74) *Attorney, Agent, or Firm* — Calfee, Halter & Griswold LLP (57) ABSTRACT An engine driven welding machine that includes a frame with lower tubular portions that extend across the ends of the frame. The lower tubular portions make it easier to lift the engine driven welding machine onto an elevated surface, such as the bed of a truck. The frame may include two different lifting portions that extend across the same side or end of the frame at different levels. For example, two tubular portions of the frame may extend generally horizontally across the same side or end of the frame to provide two lifting areas at different levels of the frame.

20 Claims, 9 Drawing Sheets

(56) References Cited

U.S. PATENT DOCUMENTS

| | | |
|---|---|---|
| D434,428 S | 11/2000 | Krieck |
| 6,181,019 B1 * | 1/2001 | Frank .......................... 290/1 A |
| D472,519 S | 4/2003 | Buck |
| D475,726 S | 6/2003 | Suga et al. |
| 6,596,972 B1 | 7/2003 | DiNovo et al. |
| D486,447 S | 2/2004 | Fan |
| 6,695,401 B1 | 2/2004 | Noll |
| D501,182 S | 1/2005 | Buck |
| D518,078 S | 3/2006 | Persson |
| D562,016 S | 2/2008 | Tomasch et al. |
| D566,029 S | 4/2008 | Swinson, II |
| D580,860 S | 11/2008 | Xi-Ren |
| D583,743 S | 12/2008 | Swinson, III |
| D588,987 S | 3/2009 | Kato |
| D617,269 S | 6/2010 | van Deursen |
| 2004/0168654 A1 | 9/2004 | Radtke |
| 2004/0182845 A1 | 9/2004 | Crisler et al. |
| 2006/0081577 A1 | 4/2006 | Andersen et al. |
| 2007/0263760 A1 | 11/2007 | Taillandier |
| 2008/0238107 A1 * | 10/2008 | Yamamoto et al. ........... 290/1 R |

OTHER PUBLICATIONS

POWER-ARC 4000, Operator's Manual, Copyright 2003, Lincoln Global Inc., 50 pgs.

Renegade 180 brochure, Miller Electric Mfg. Co., issued Jan. 2008, 8 pgs.

Two page printout from http://www.zena.net/htdocs/welders/wldpic_me.shtml, printed Oct. 1, 2008, Do It Yourself Engine Driven Welder, Zena, Incorporated.

Notice of Allowance from U.S. Appl. No. 29/345,560 dated Jan. 28, 2010.

International Search Report and Written Opinion from PCT/IB09/007038 dated Jan. 22, 2010.

Office action from U.S. Appl. No. 29/360,154 dated Jun. 25, 2010.

Notice of Allowance from U.S. Appl. No. 29/325,637 dated Sep. 30, 2009.

* cited by examiner

ENGINE DRIVEN WELDING MACHINE

FIELD OF THE INVENTION

This invention pertains to engine driven welding machines, and more particularly to frames for engine driven welding machines.

BACKGROUND OF THE INVENTION

Figure 1:
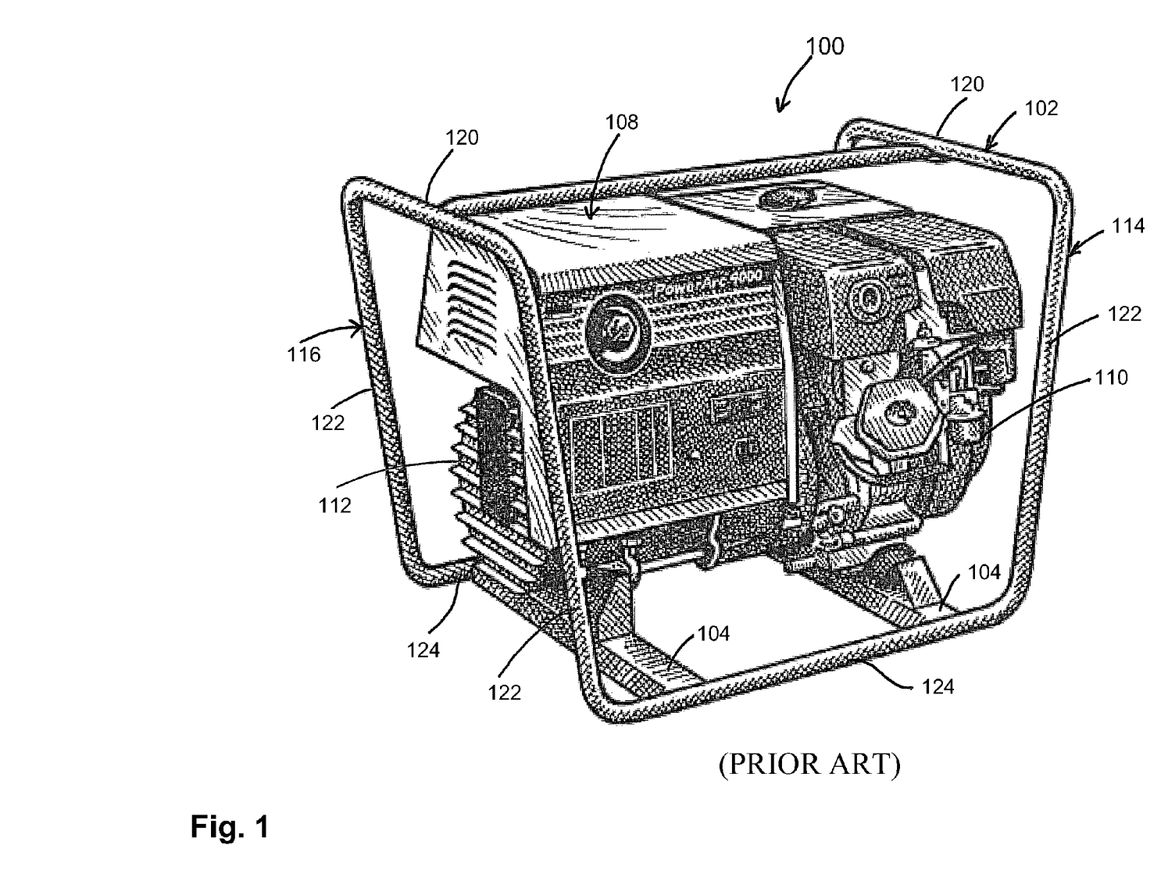
FIG. 1 is a perspective view of a prior art engine driven welding machine.
Figure 2:
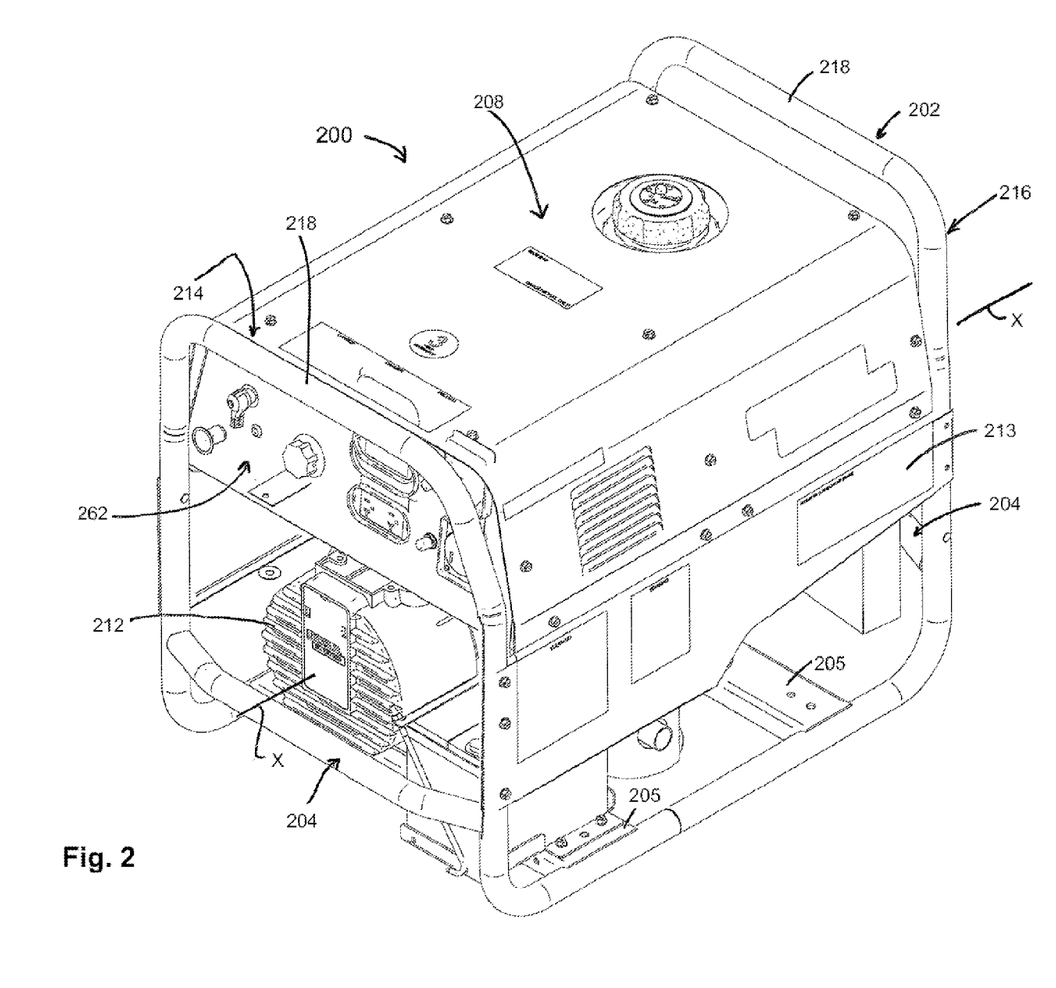
FIG. 2 is a perspective view of an exemplary embodiment of an engine driven welding machine.
Figure 3:
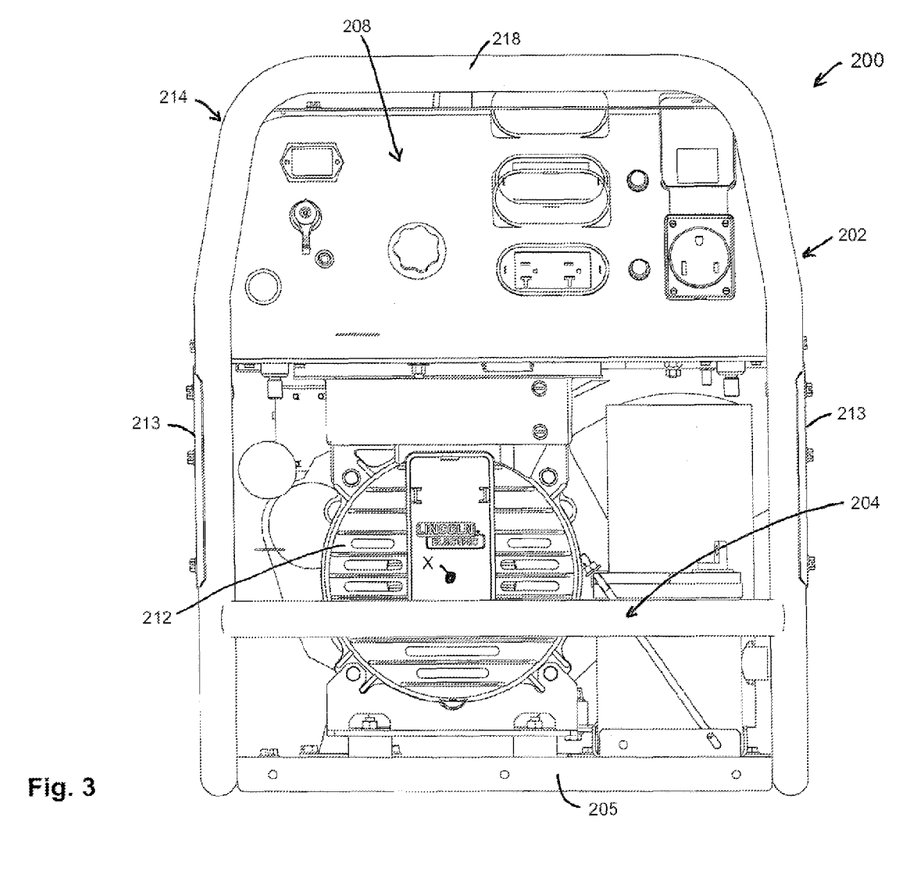
FIG. 3 is a front view of the engine driven welding machine of FIG. 2.

Engine driven welding machines include a gas powered engine that drives a generator which supplies power to a welding electrode. One commercially successful line of engine driven welding machines is the POWER-ARC™ series from LINCOLN ELECTRIC®, an example of which is illustrated in FIG. 1. This engine driven welding machine 100 includes a tubular frame 102, mounts 104 connected to the frame 102, and an assembly 108 of an engine 110 and a generator 112 supported on the mounts 104. The frame 102 has spaced apart end portions 114, 116. The engine 110 is adjacent to the end portion 114 and the generator 112 is adjacent to the end portion 116. The end portions 114, 116 are mirror images of one another and each include a straight top portion 120 and a pair of spaced apart side portions 122, that extend downward from the top portion 120. Straight bottom portions 124 connect the spaced apart side portions 122 of the end portions 114, 116 to form a unitary tubular frame 102.

The engine 110 and the generator 112 may have considerable weight. The engine driven welding machine 100 may be transported to various locations. For example, the engine driven welding machine 100 may be placed in a vehicle, such as in an open bed of a truck, for example a pick-up truck bed. To move the engine driven welding machine 100 to the bed of the truck, two or more people may lift the frame 102 and place the welding machine in the truck. The two or more people may grab any portion of the frame 102 to perform this lift. For example, the two or more people may grab the top portions 120 and/or the side portions 122, 124 of the end portions 114, 116 and/or the bottom portions 130, 132 during lifting of the engine driven welding machine into the truck.

SUMMARY

The present application discloses in one embodiment, an engine driven welding machine that includes a frame with lower tubular portions that extend across the ends of the frame. The lower tubular portions make it easier to lift the engine driven welding machine onto an elevated surface, such as the bed of a truck. In another exemplary embodiment, the frame includes two lifting portions that extend across the same side or end of the frame at different levels. For example, two tubular portions of the frame may extend generally horizontally across the same side or end of the frame to provide two lifting areas at different levels of the frame. In another embodiment, the disclosed frame with lower tubular portions that extend across the ends of the frame may be used in applications other than in engine driven welding machines.

These and other aspects and advantages of the inventions disclosed herein will be readily apparent to those skilled in the art from a reading of the following detailed description of the exemplary embodiments in view of the accompanying drawings.

BRIEF DESCRIPTION OF THE DRAWINGS

In the accompanying drawings which are incorporated in and constitute part of the specification, embodiments of the invention are illustrated, which, together with a general description of the invention given above, and the detailed description given below, serve to exemplify the embodiments of this invention.

DETAILED DESCRIPTION

While the inventions are described herein with specific reference to a variety of exemplary structural and material features, such descriptions are intended to be exemplary in nature and should not be construed in a limiting sense. Further, while various aspects of the invention are described and illustrated herein as embodied in combination in the exemplary embodiment, these various aspects may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative, materials, structures, configurations, methods, devices, and so on may be described herein, such descriptions are not intended to be a complete or exhaustive list of available alternative embodiments, whether presently known or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

The present application discloses an exemplary embodiment of an engine driven welding machine 200 that includes a frame 202 with lower tubular portions 204 that extend across end portions 214, 216 of the frame. Top tubular portions 218 also extend across the end portions 214, 216. Having both the lower tubular portions 204 and the upper tubular portions 218 that extend across the end portions 214, 216 makes it easier to lift the engine driven welding machine 200 onto an elevated surface (not shown), such as the bed of a truck. The illustrated top tubular portions 218 and lower tubular portions 204 provide two lifting areas that extend across the same side or end that are at different levels. To move the engine driven welding machine 200 to the bed of a truck, such as a pick-up truck, two or more people may grab the top tubular portions 218 and lift the frame 202 to a first height that is lower than the bed of the truck. The two or more people may grab the lower tubular portions 204 to continue raising the frame 202 onto the bed. The two or more people may grab the top tubular portions 218 and the lower tubular portions 204 at the same time, or the two or more people may switch from the top tubular portions 218 to the lower tubular portions 204 during the lift.

Figure 4:
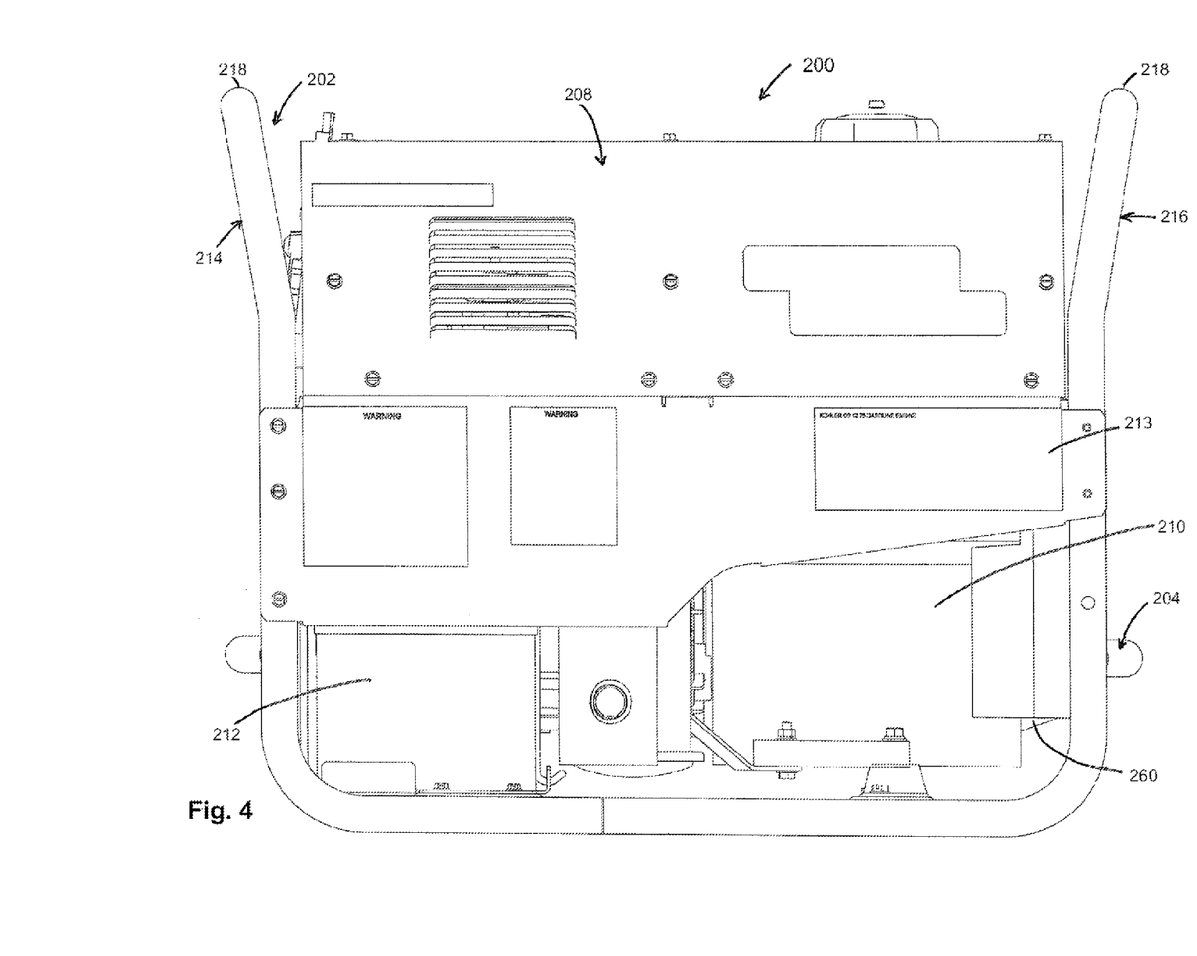
FIG. 4 is a side view of the engine driven welding machine of FIG. 2.
Figure 5:
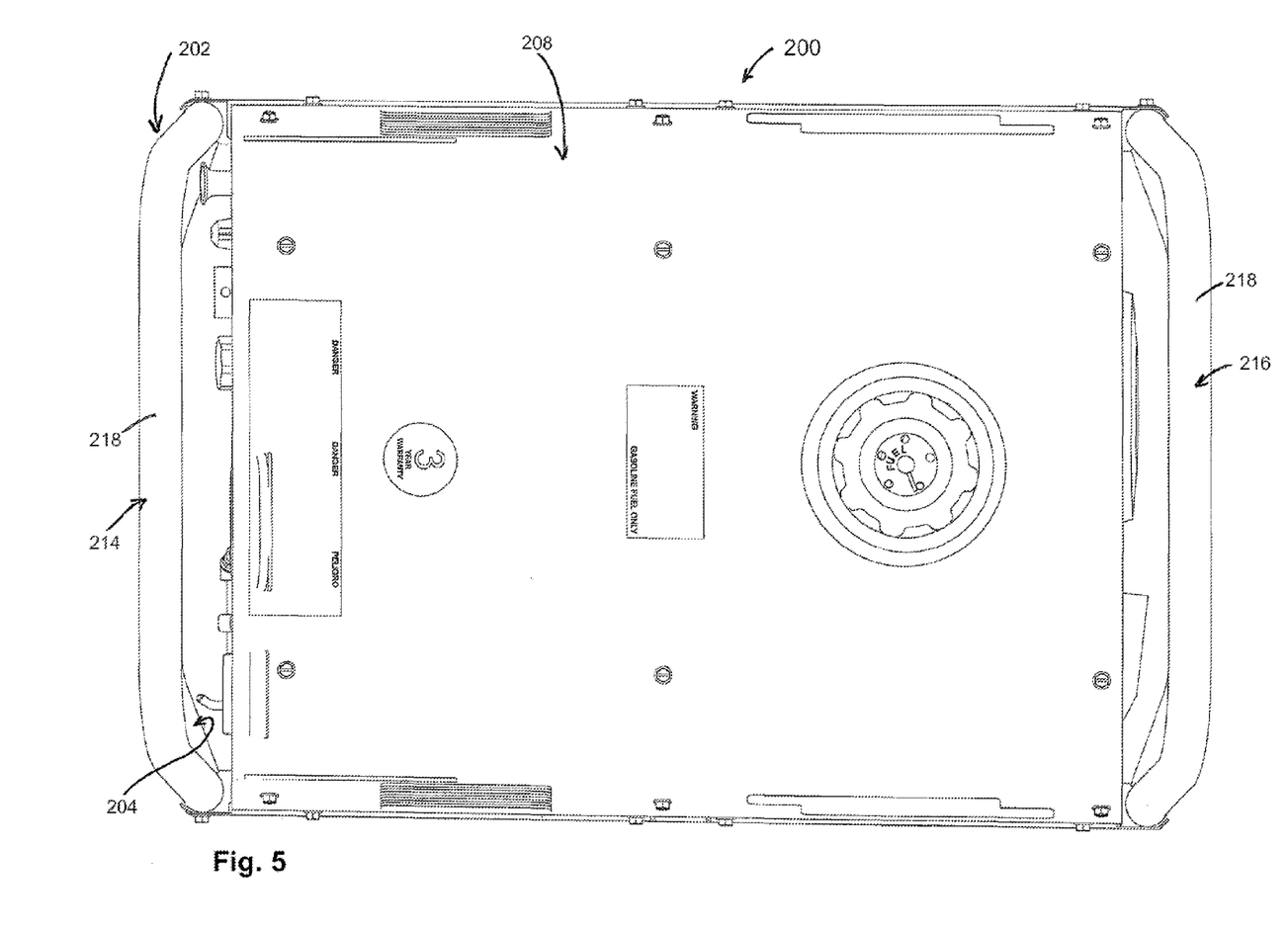
FIG. 5 is a top view of the engine driven welding machine of FIG. 2.
Figure 6:
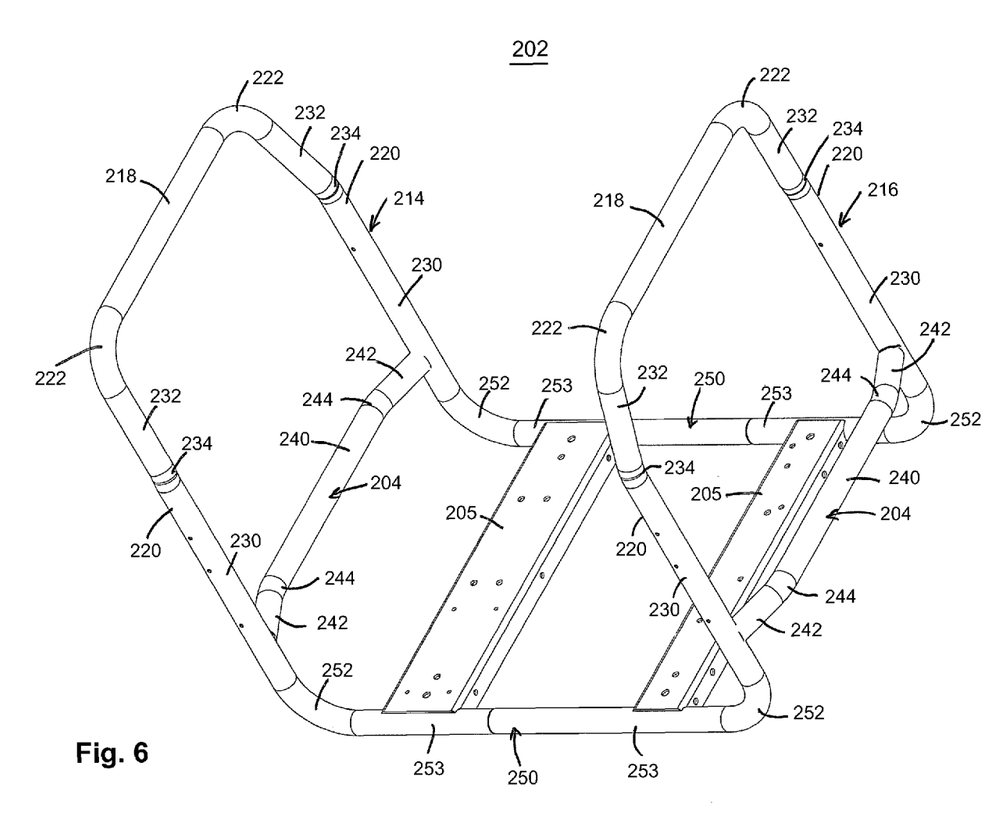
FIG. 6 is a perspective view of a frame and mounts of the engine driven welding machine of FIG. 2.

The engine driven welding machine 202 can take a variety of different forms without departing from the spirit and scope of the present invention. In the illustrated embodiment, the engine driven welding machine 200 includes the tubular frame 202, mounts 205 connected to the frame 202, and an assembly 208 of an engine 210 (see FIG. 4) and a generator 212 supported on the mounts 205. The engine driven welding machine 202 may also include optional panels 213 or braces made from sheet metal that we attached to the end portions 214, 216 of the frame.

The tubular frame 202 may be made from a variety of different materials. For example, the tubular frame 202 may be made from metal tube, such as steel tube, plastic tube, or tube made from other materials. Any component of the tubular frame 202 described below may be made from tube material, but it is not required that all of the components of the tubular frame be made from tube material.

The frame 202 has spaced apart end portions 214, 216. The engine 210 is adjacent to the end portion 216 and the generator 212 is adjacent to the end portion 214. FIGS. 6-9 illustrate an exemplary embodiment of the frame 202. In the illustrated embodiment, the end portions 214, 216 are mirror images of one another. The end portions 214, 216 can take a wide variety of different forms and need not be identical to one another or mirror images of one another as in the illustrated embodiment. Each of the first and second spaced apart end portions 214, 216 includes an upper or top tubular portion 218, a pair of spaced apart side tubular portions 220 that are connected to and extend downward away from the top tubular portion 218, and a lower tubular portion 204 that is connected to an extends between the spaced apart side tubular portions 220.

The top tubular portion 218 can take a wide variety of different forms. For example, the top tubular portion 218 may be curved or bent or may be straight, as in the illustrated embodiment. The top tubular portion 218 may be connected to the side tubular portions 220 in a wide variety of different ways. For example, the top tubular portion 218 may be integrally formed with the side tubular portions 220, may be fastened to the side tubular portions 220, may be welded to the side tubular portions 220, etc. In the illustrated embodiment, curved tubular portions 222 are integrally formed with the top tubular portion 218 and the side tubular portions 220. For example, a single piece of tube may be bent to integrally form the top tubular portion 218 and side tubular portions 220. In another embodiment, upper ends of the side tubular portions 220 may extend past the upper or top tubular portion 218.

Figure 7:
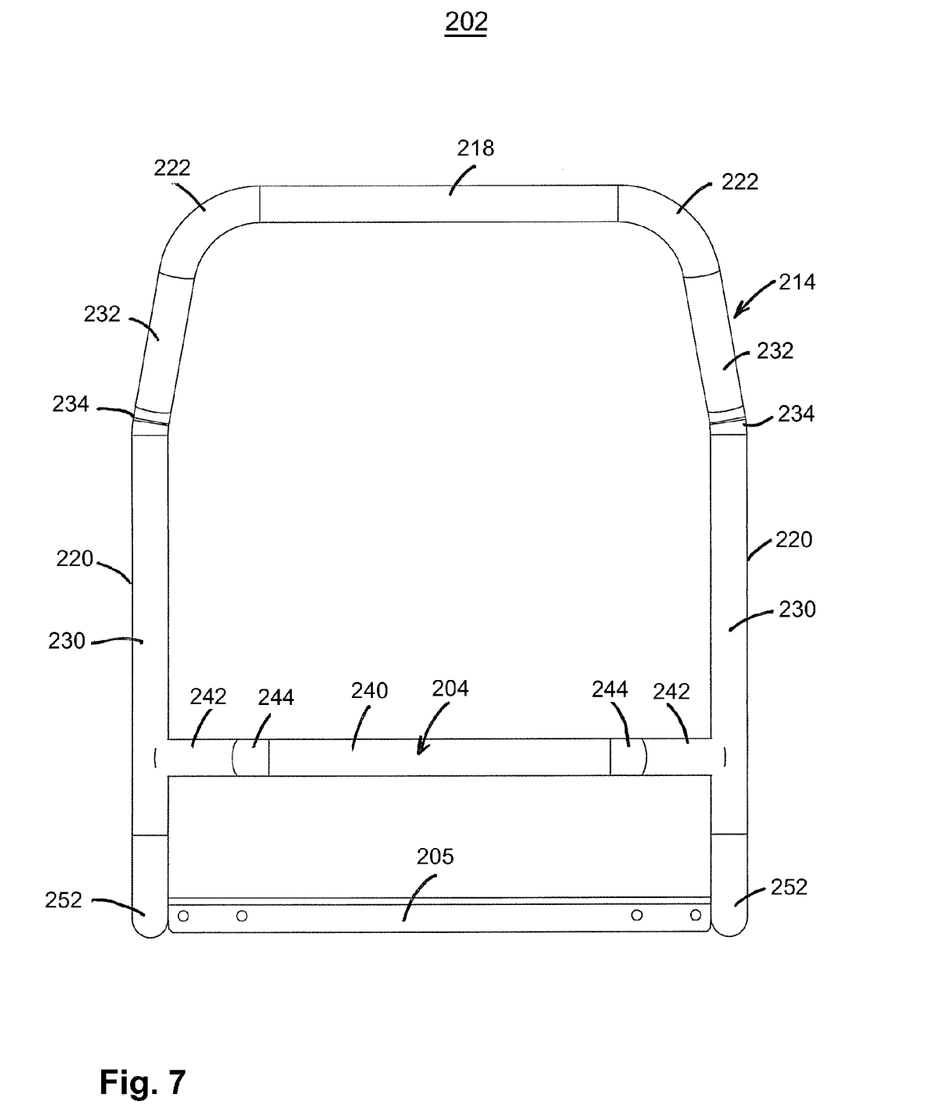
FIG. 7 is a front view of the frame and mounts of FIG. 6.
Figure 8:
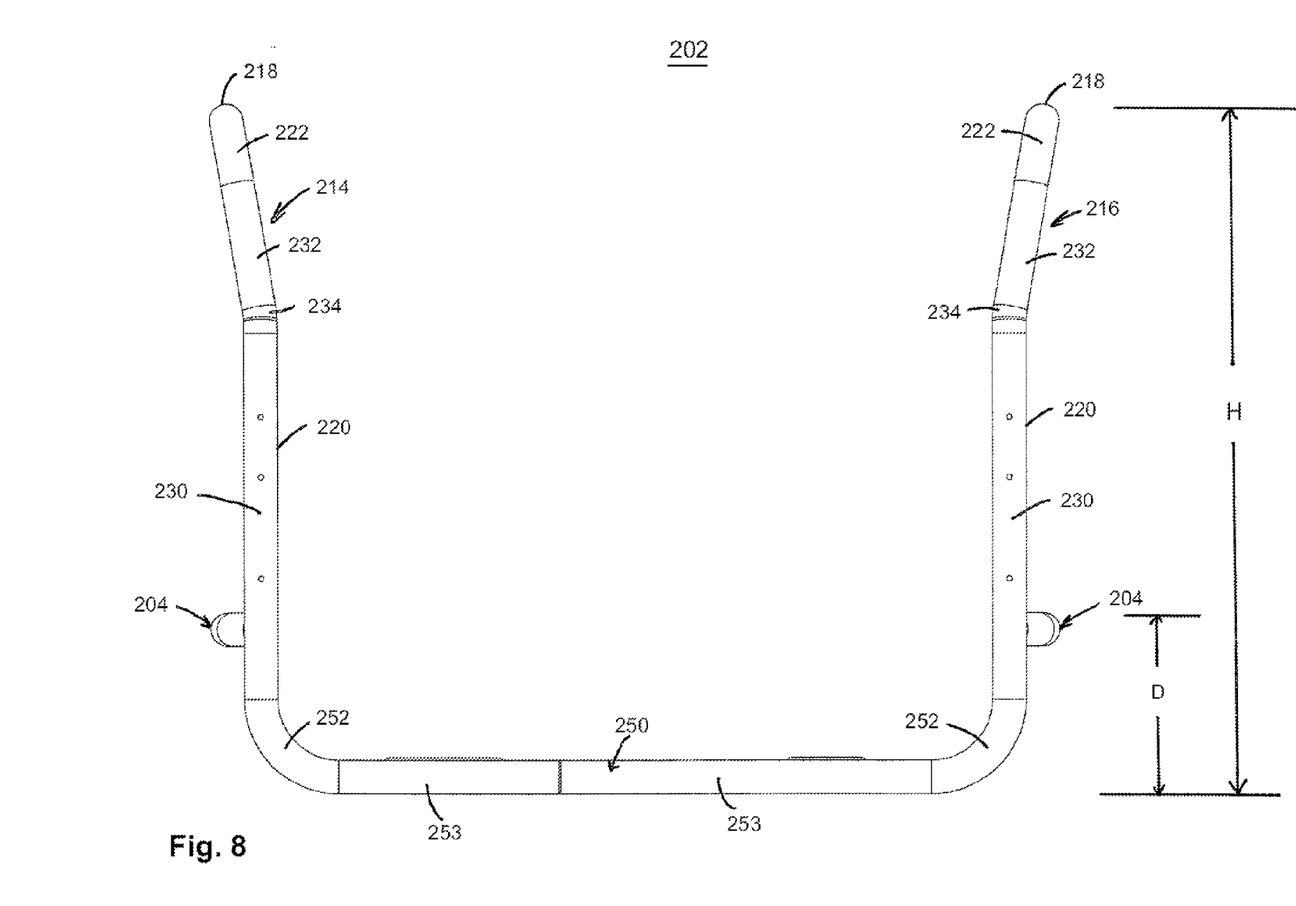
FIG. 8 is a side view of the frame and mounts of FIG. 6.

The side tubular portions 220 may take a wide variety of different forms. For example, the side tubular portions may be straight, may be curved, or may have curved portions and straight portions. In the example illustrated by FIGS. 6-9, the side tubular portions 220 each include a lower straight portion 230, an upper straight portion 232, and a bent portion 234 that connects the lower straight portion 230 with the upper straight portion 232. Referring to FIGS. 7 and 8, the illustrated lower straight portions 230 extend vertically or substantially vertically. The bent portion 234 is configured such that the upper straight portions 232 of the end portion 214 extend toward one another (See FIG. 7, the same is the case for end portion 216) and the upper straight portions 232 of the end portion 214 extend away from the upper straight portions 232 of the end portion 216 (See FIG. 8). As a result, in FIG. 7 the end portions 214, 216 have an appearance that resembles an "A" and in FIG. 8 the frame 202 has the appearance that resembles a "U" with a widening mouth.

Figure 9:
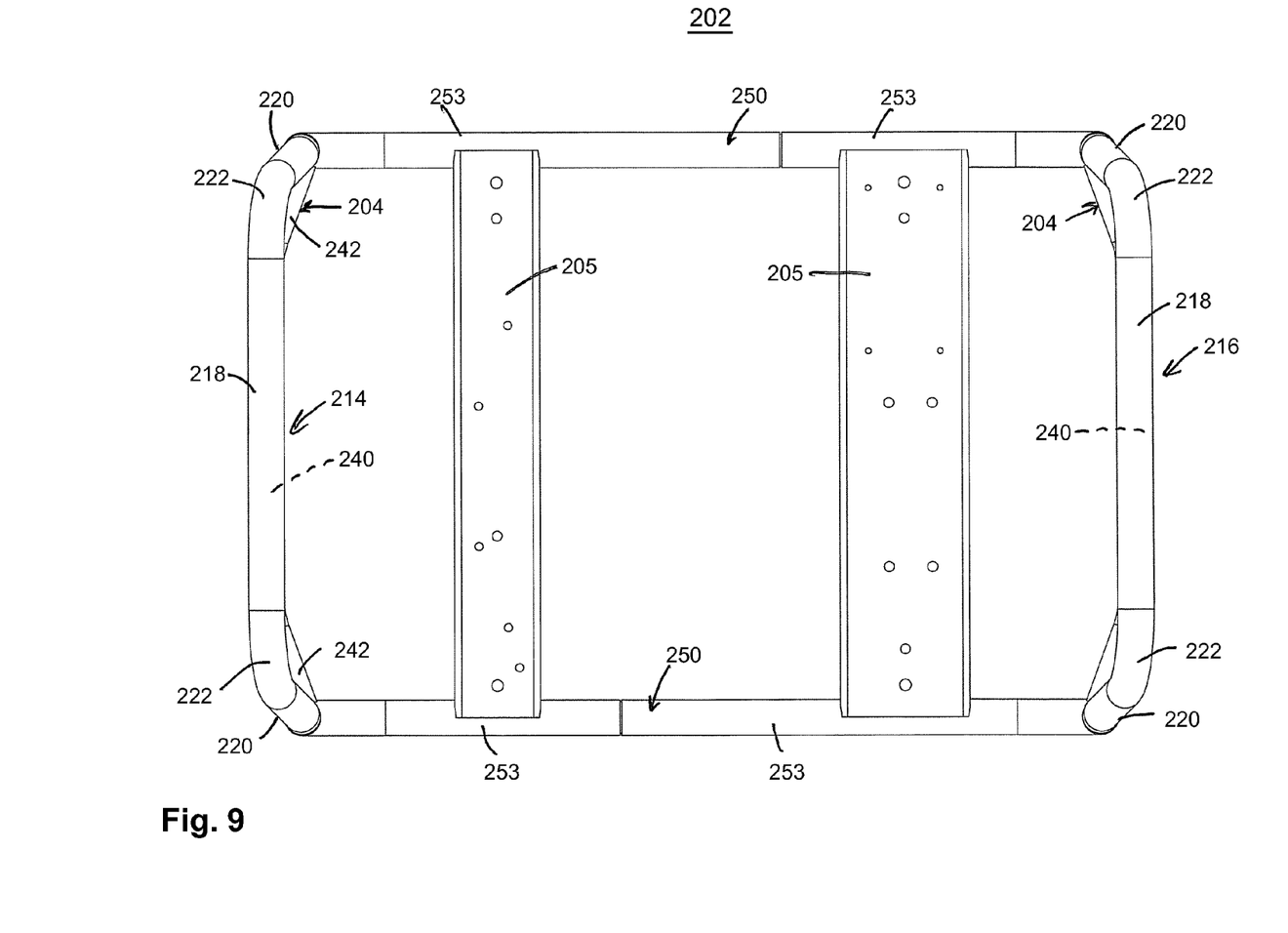
FIG. 9 is a top view of the frame and mounts of FIG. 6.

The lower tubular portions 204 can take a wide variety of different forms and can be attached to the side tubular portions 220 in a wide variety of different ways. For example, the lower tubular portions 204 may be straight, may be curved, or may have curved portions and straight portions. The lower tubular portions 204 may be integrally formed with the side tubular portions 220, may be fastened to the side tubular portions 220, may be welded to the side tubular portions 220, etc. In the illustrated embodiment, the lower tubular portions 204 each include a straight central tubular portion 240, two straight outer tubular portions 242, and two curved or bent tubular portions 244 that connect the two straight outer tubular portions 242 to the straight central tubular portion. In the illustrated embodiment, the lower tubular portions 204 are welded to the side tubular portions 220 such that the lower tubular portion 204 extends horizontally or generally horizontally from the side tubular portions 220. Referring to FIGS. 8 and 9, the two straight outer tubular portions 242, and two curved or bent tubular portions 244 are configured such that the straight central tubular portion 240 is vertically aligned or substantially vertically aligned with the top tubular portion 218.

First and second bottom tubular portions 250 are connected to and extend between the spaced apart side tubular portions 220 to connect the first and second spaced apart end portions 214, 216. The bottom tubular portions 250 can take a wide variety of different forms. For example, the bottom tubular portions 250 may be curved or bent or may be straight, as in the illustrated embodiment. The bottom tubular portions 218 may be connected to the side tubular portions 220 in a wide variety of different ways. For example, the bottom tubular portions 250 may be integrally formed with the side tubular portions 220, may be fastened to the side tubular portions 220, may be welded to the side tubular portions 220, etc. In the illustrated embodiment, curved tubular portions 252 are integrally formed with the bottom tubular portion 250 and the side tubular portions 220. For example, a single piece of tube may be bent to integrally form the top tubular portion 218, the side tubular portions 220, and segments 253 of the bottom tubular portion 250. Two such identical halves, each formed from a single piece of tube can be assembled, for example by welding the segments 253 together, to form a completed frame.

Referring to FIGS. 6-9, at least one mount 205 that extends between and is connected to the spaced apart bottom tubular portions 250. The mounts 205 can take a wide variety of different forms. The illustrated mounts 205 are sheet metal panels that form a flat support surface that supports the assembly 208 of the engine 210 and the generator 212. Referring to FIGS. 2-5, in the illustrated embodiment, the engine 210 and generator 212 are arranged between the end portions 114, 116 such that the generator 212 is disposed between the engine 210 and the first end portion 114 and the engine 210 is between the generator 212 and the second end portion 116. That is, the first end portion 114, generator 212, engine 210, and second end portion 116 are arranged in a row. In one embodiment, a pull-start cord housing 260 (see FIG. 4) of the engine 210 is positioned adjacent to the lower tubular portion 204 of the second end portion 216. An outlet panel 262 that allows for connection of the welder's electrodes (not shown) may be positioned above the lower tubular portion 204 of the first end portion 214. This allows the lower tubular portion 204 to be used as a strain relief for the cables of the welder. The engine 210 includes a drive shaft that drives an input to the generator 212 about an axis X that is parallel to or generally parallel to the bottom tubular portions 250 and is transverse to the lower tubular portions 204. It should be apparent that the orientation of the assembly 208 of the engine 210 and generator 212 can be changed in the frame. For example, the assembly 208 could be rotated 90 degrees with respect to the frame 200, such that the drive shaft is parallel or generally parallel to the lower tubular portions 204.

The lower tubular portions 204 can be connected to the frame at any height above the bottom tubular portions 250 and, in an exemplary embodiment, above the mounts 205. By placing the lower tubular portions 204 above the bottom tubular portions 250, the two or more people that lift the engine driven welding machine 200 can place the machine on a surface without letting go of the lower tubular portions 204.

Referring to FIG. 8, a height H of the tubular frame is defined as a vertical distance between the top tubular portions 218 and the bottom tubular portions 250. In an exemplary embodiment, a vertical distance D between the lower tubular portion 204 and the bottom tubular portions 250 is less than one-half of the height H. For example, the distance D may be less than ⅓ of the height H, or less than ¼ of the height H. In the exemplary embodiment, the lower tubular portion 204 is at least two-inches above the mounts 205 and may be at least three, four, five, or several inches above the mounts 205.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. An engine driven welding machine comprising:
    a tubular frame that includes:
        first and second spaced apart end portions, wherein each of the first and second spaced apart end portions includes a pair of spaced apart side tubular portions, an upper tubular portion that is connected to and extends between the pair of spaced apart side tubular portions, and a lower tubular portion that is connected to and extends between the spaced apart side tubular portions;
        wherein each of said side tubular portions includes a lower straight portion that extends in a substantially vertical direction that is perpendicular to the direction of the top tubular portion;
        wherein the lower tubular portion includes a straight central tubular portion that is parallel to the upper tubular portion, two straight outer tubular portions, and two bent tubular portions that connect the two straight outer tubular portions to the straight central tubular portion;
        first and second bottom tubular portions that are connected to and extend between the spaced apart side tubular portions to connect the first and second spaced apart end portions;
        wherein a height H of the tubular frame is defined as a vertical distance between the upper tubular portions and the bottom tubular portions;
        wherein a vertical distance between the lower tubular portion and the bottom tubular portion is less than one-half of said height H;
    at least one mount that extends between and is connected to said spaced apart bottom portions;
    an assembly of an engine and a generator supported by said at least one mount;
    wherein the lower tubular portion is positioned above the mounts and the bottom tubular portions.

2. The engine driven welding machine of claim 1 wherein the upper tubular portions are connected at tops of the spaced apart side tubular portions.

3. The engine driven welding machine of claim 1 wherein said generator is disposed between said engine and said first end portion of said tubular frame.

4. The engine driven welding machine of claim 1 wherein each of said side tubular portions includes a lower straight portion, an upper straight portion, and a bent portion that connects the lower straight portion to the upper straight portion.

5. The engine driven welding machine of claim 4 wherein the lower straight portions are vertical when the frame is positioned on a flat, level surface.

6. The engine driven welding machine of claim 4 wherein the lower straight portions are parallel to one another.

7. The engine driven welding machine of claim 4 wherein the upper straight portions of the first end portion extend toward one another in a direction toward said upper tubular portion.

8. The engine driven welding machine of claim 5 wherein the upper straight portions of the first end portion extend toward one another in a direction toward said upper tubular portion.

9. The engine driven welding machine of claim 4 wherein the upper straight portions of the first end portion extend away from the upper straight portions of the second end portion in a direction toward said upper tubular portions.

10. The engine driven welding machine of claim 5 wherein the upper straight portions of the first end portion extend away from the upper straight portions of the second end portion in a direction toward said upper tubular portions.

11. The engine driven welding machine of claim 1 wherein the straight central tubular portion of the lower tubular portion of the first end portion is in vertical alignment with the upper tubular portion of the first end portion.

12. The engine driven welding machine of claim 8 wherein the straight central tubular portion of the lower tubular portion of the first end portion is in vertical alignment with the upper tubular portion of the first end portion.

13. The engine driven welding machine of claim 9 wherein the straight central tubular portion of the lower tubular portion of the first end portion is in vertical alignment with the upper tubular portion of the first end portion.

14. The engine driven welding machine of claim 1 wherein a vertical distance between the lower tubular portion and the bottom tubular portion is less than one-third of said height H.

15. The engine driven welding machine of claim 1 wherein the lower tubular portion is positioned at least two inches above the mounts and the bottom tubular portions.

16. The engine driven welding machine of claim 1 further comprising a pair of side panels that are each connected to and extend between the side tubular portions of the first and second spaced apart end portions.

17. An engine driven welding machine comprising:
    a tubular frame that includes:
        first and second spaced apart end portions, wherein each of the first and second spaced apart end portions includes a pair of spaced apart side tubular portions, a top tubular portion that is connected to and extends between the pair of spaced apart side tubular portions, and a lower tubular portion that is connected to and extends between the spaced apart side tubular portions, wherein each of said side tubular portions includes a lower straight portion that extends in a substantially vertical direction that is perpendicular to the direction of the top tubular portion, an upper straight portion, and a bent portion that connects the lower straight portion to the upper straight portion, the lower straight portions are generally vertical when the frame is positioned on a flat, level surface, the upper straight portions of the first end portion extend toward one another in a direction toward said top tubular portion, and the upper straight portions of the first end portion extend away from the upper straight portions of the second end portion in a direction toward said top tubular portions;

first and second bottom tubular portions that are connected to and extend between the spaced apart side tubular portions to connect the first and second spaced apart end portions;

wherein the lower tubular portion includes a straight central tubular portion that is parallel to the top tubular portion, two straight outer tubular portions, and two bent tubular portions that connect the two straight outer tubular portions to the straight central tubular portion;

wherein a height H of the tubular frame is defined as a vertical distance between the upper tubular portions and the bottom tubular portions;

wherein a vertical distance between the lower tubular portion and the bottom tubular portion is less than one-half of said height H;

at least one mount that extends between and is connected to said spaced apart bottom portions;

an assembly of an engine and a generator supported by said at least one mount, wherein said generator is disposed between said engine and said first end portion of said tubular frame;

wherein the lower tubular portion is positioned at least two inches above the mounts and the bottom tubular portions.

18. The engine driven welding machine of claim 17 wherein the straight central tubular portion of the lower tubular portion of the first end portion is in vertical alignment with the upper tubular portion of the first end portion.

19. The engine driven welding machine of claim 17 further comprising a pair of side panels that are each connected to and extend between the side tubular portions of the first and second spaced apart end portions.

20. A frame for an engine driven welding machine comprising:

first and second spaced apart end portions, wherein each of the first and second spaced apart end portions includes a pair of spaced apart side tubular portions, an upper tubular portion that is connected to and extends between the pair of spaced apart side tubular portions, and a lower tubular portion that is connected to and extends between the spaced apart side tubular portions;

wherein each of said side tubular portions includes a lower straight portion that extends in a substantially vertical direction that is perpendicular to the direction of the upper tubular portion, an upper straight portion, and a bent portion that connects the lower straight portion to the upper straight portion such that the upper straight portion is offset from the substantially vertical direction;

wherein each of said lower tubular portions includes a straight central tubular portion that is parallel to the upper tubular portion, two straight outer tubular portions, and two bent tubular portions that connect the two straight outer tubular portions to the straight central tubular portion;

first and second bottom tubular portions that are connected to and extend between the spaced apart side tubular portions to connect the first and second spaced apart end portions;

wherein the lower tubular portion is positioned above the bottom tubular portions.

\* \* \* \* \*